United States Patent
Mishra et al.

(10) Patent No.: US 9,846,806 B2
(45) Date of Patent: Dec. 19, 2017

(54) PERFORMING AUTOMATED TASKS BASED ON VISUAL CUES

(71) Applicant: Amazon Technologies, Inc., Reno, NV (US)

(72) Inventors: Pragyana K. Mishra, Seattle, WA (US); Jules Cook Graybill, Seattle, WA (US); Danny Guan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 480 days.

(21) Appl. No.: 14/315,717

(22) Filed: Jun. 26, 2014

(65) Prior Publication Data

US 2015/0379347 A1     Dec. 31, 2015

(51) Int. Cl.
  *G06K 9/00* (2006.01)
  *G06Q 10/06* (2012.01)
  *G06Q 10/08* (2012.01)

(52) U.S. Cl.
  CPC ..... *G06K 9/00577* (2013.01); *G06K 9/00624* (2013.01); *G06Q 10/06* (2013.01); *G06Q 10/08* (2013.01); *G06K 2209/19* (2013.01)

(58) Field of Classification Search
  CPC ........... G06K 2209/19; G06K 9/00577; G06K 9/00624; G06Q 10/06; G06Q 10/08
  See application file for complete search history.

(56) References Cited

U.S. PATENT DOCUMENTS

| | | | |
|---|---|---|---|
| 2002/0143643 A1* | 10/2002 | Catan | G06Q 30/06 235/375 |
| 2009/0237546 A1 | 9/2009 | Bloebaum et al. | |
| 2010/0082152 A1* | 4/2010 | Mishra | G06Q 10/08 700/226 |
| 2013/0038633 A1 | 2/2013 | Maggiore | |
| 2014/0139654 A1 | 5/2014 | Takahashi | |

OTHER PUBLICATIONS

International Search Report and Written Opinion for PCT Application No. PCT/US2015/037534 dated Sep. 8, 2015.

* cited by examiner

*Primary Examiner* — M D Haque
(74) *Attorney, Agent, or Firm* — Arthorus, PLLC

(57) ABSTRACT

Visual cues may be provided for the purpose of triggering the performance of one or more actions associated with a given task. A visual cue may include one or more characters or other markings on any relevant surfaces, as well as naturally appearing edges, contours or outlines within an environment in which the visual cue is provided. When one or more visual cues appear within a field of view of an imaging device, and the visual cues are recognized as such, a task relating to the visual cues may be identified, and instructions for performing the task may be provided. The task may be dependent upon a context in which the visual cues are provided, such that a single visual cue may be associated with multiple tasks in different contexts, and the performance of the task may be confirmed based on imaging data or other relevant information.

20 Claims, 12 Drawing Sheets

PERFORMING AUTOMATED TASKS BASED ON VISUAL CUES

BACKGROUND

Industrial or commercial machines may be readily programmed to perform one or more specific functions in accordance with a defined set of rules. For example, a conveyor system may be configured to recognize a presence of an object thereon, and to begin operating to cause the object to travel in at least one direction at a designated speed. Likewise, a commercial-grade oven may be programmed to cook foods for finite periods of time, or until the foods or an environment in which the foods are cooked within the oven reach a predetermined temperature set point. Thus, an industrial or commercial tool, apparatus or other machine may be provided with a set of instructions by a human operator or computer, and may begin to operate in a given manner, and continue to operate in the given manner in accordance with the set of instructions in the absence of any human or automatic intervention.

While an industrial or commercial machine may be programmed with code for performing one or more tasks, and may be triggered by inputs provided by humans or in response to timing signals or sensed signals, today's industrial or commercial machines or the computer hardware components or software modules operating thereon are limited in their ability to receive instructions for performing multiple tasks, or to adapt to changes in circumstances that may affect their ability to perform in accordance with such instructions. For example, cooking chicken to internal temperatures of at least 165° F., and cooking seafood to internal temperatures of at least 145° F., are generally recommended practices. However, while a commercial oven may be programmed to cook foods at predetermined temperatures or for finite periods of time, the commercial oven cannot distinguish between chicken and seafood, or recognize the different cooking requirements for each type of food. Similarly, a box containing porcelains or crystals should be handled with care, while a box containing baseballs does not usually require any particular handling instructions. Although a conveyor system may be configured to transport boxes of porcelains or crystals alongside boxes of baseballs, the conveyor system is unable to recognize that one box includes fragile items and another box includes durable sporting goods, or that each box has different threshold handling conditions associated therewith.

Instead, an industrial or commercial machine that is programmed or configured to perform a specific task must be reprogrammed or reconfigured, typically by a human operator, in order to perform a different specific task. Industrial or commercial machines typically may not easily be programmed to carry out multiple tasks based on varying disparate business needs or functions.

DETAILED DESCRIPTION

As is set forth in greater detail below, the present disclosure is directed to the performance of one or more automated tasks based on visual cues, which may include one or more symbols, labels or markings including but not limited to one or more alphanumeric characters (e.g., letters or numbers) or combinations thereof that are provided on any relevant surface within a defined environment, as well as shapes, insignias or logos that may be provided on one or more objects that are visible within a field of view of an imaging device, e.g., a digital camera. Specifically, the systems and methods disclosed herein may be configured to recognize a visual cue or a pattern of visual cues within an image or a set of imaging data captured using a digital camera or other form of imaging device. The systems and methods disclosed herein may be further configured to associate the visual cue or pattern with a particular task, to automatically identify one or more actions associated with the task upon sensing the visual cue, and to initiate the performance or execution of one or more of the actions using one or more machines in communication with the digital camera or other imaging device which captured the images or imaging data from which the visual cue or pattern was recognized. Such tasks may bear any relation to an object or an environment in which the object is provided, and the tasks may be directed to having any relevant or desired effect on the object or the environment.

Additionally, the systems and methods of the present disclosure may be further configured to recognize a context in which a visual cue or pattern is provided, and to tailor an association of the visual cue or pattern with a task, or the identification of one or more actions associated with the task, based on the recognized context. Finally, the systems and methods disclosed herein may be configured to determine, based on an image or imaging data subsequently captured, whether the performance of the actions was completed as intended.

Figure 1A:
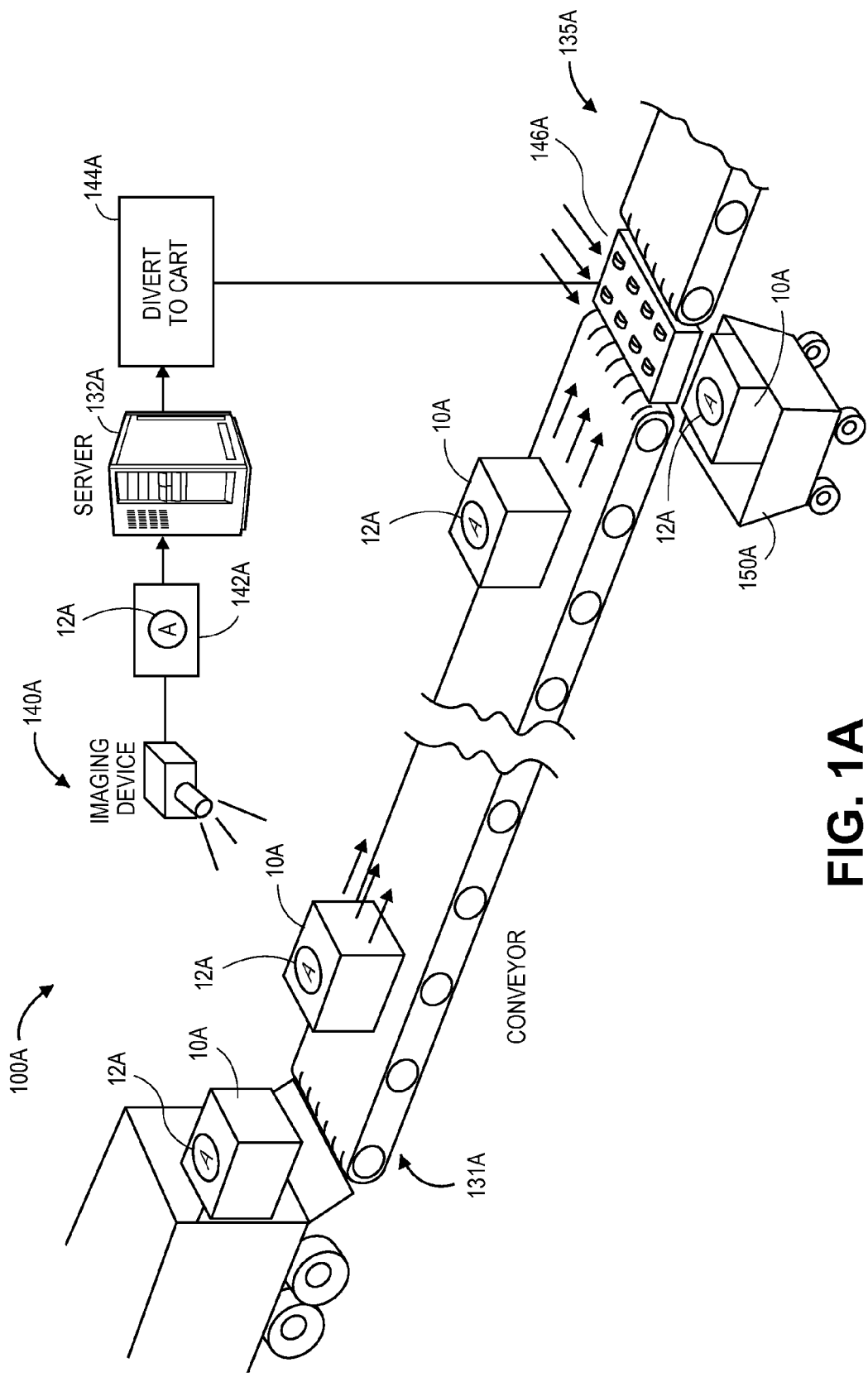
FIGS. 1A and 1B are views of components of systems for performing automated tasks based on visual cues in accordance with embodiments of the present disclosure.
Figure 1B:
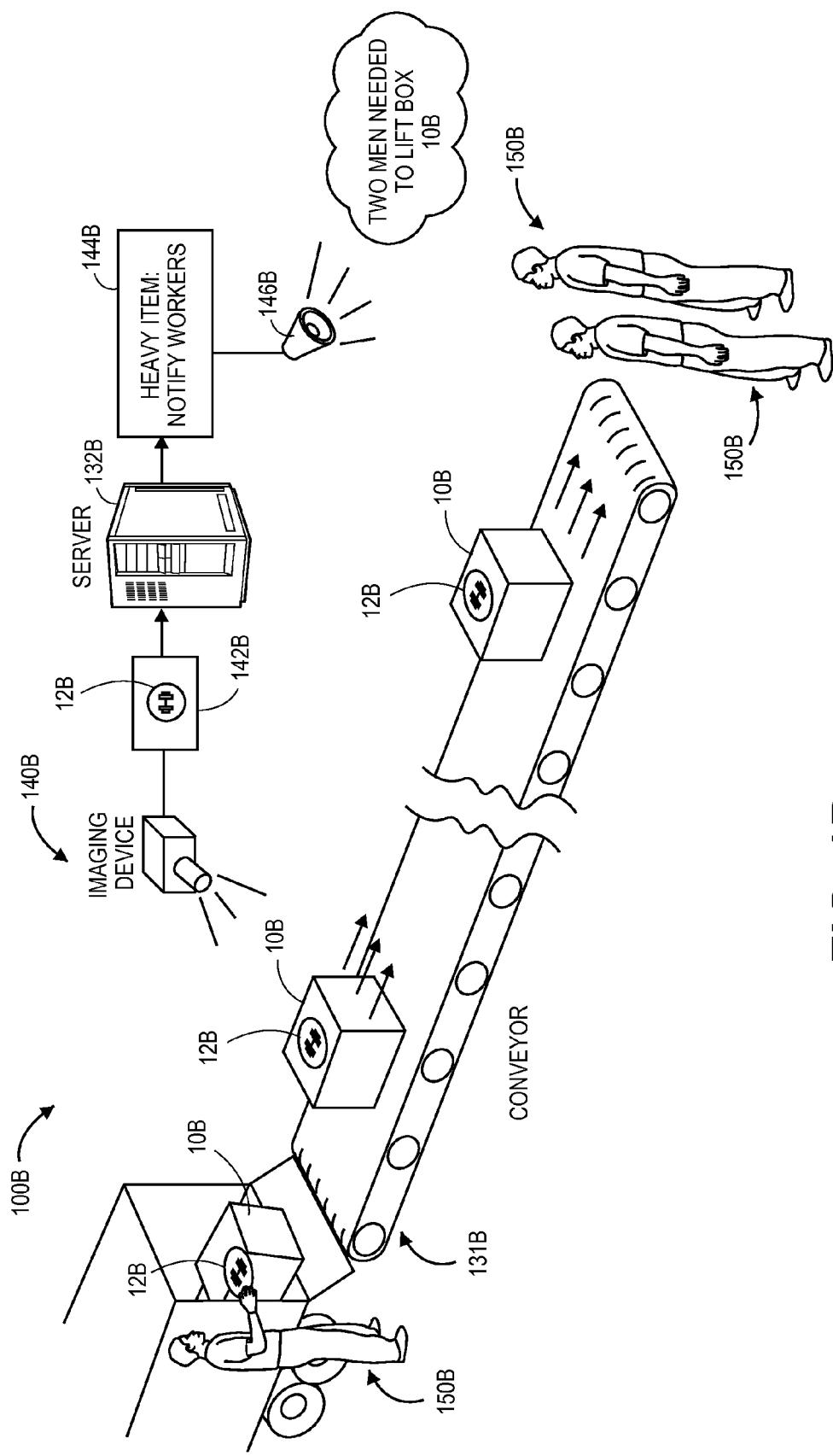

Referring to FIGS. 1A and 1B, components of systems 100A, 100B for performing automated tasks based on visual cues are shown. As is shown in FIG. 1A, the system 100A includes a first conveyor 131A, a server 132A, a second conveyor 135A, an imaging device 140A, a diverter 146A and a cart 150A. An item 10A including a visual cue 12A in the form of a symbol, viz., a letter A in a circle, applied or affixed thereon is traveling along the first conveyor 131A toward the second conveyor 135A. The imaging device 140A is configured to capture an image of the item 10A as the item 10A travels along the first conveyor 131A toward the second conveyor 135A. The server 132A is in communication with the imaging device 140A and with the diverter 146A. The cart 150A is provided to receive items diverted from a path defined by the first conveyor 131A using the diverter 146A.

In accordance with the present disclosure, the visual cue 12A on the item 10A may be recognized in an image 142A captured using the imaging device 140A and provided to the server 132A. Once the visual cue 12A has been recognized, the server 132A may identify an instruction 144A associated with the visual cue 12A, viz., an instruction to transfer the item 10A to the cart 150A, and provide the instruction 144A to the diverter 146A. Subsequently, when the item 10A arrives at the diverter 146A from the first conveyor 131A, the item 10A is transferred into the cart 150A by the diverter 146A in response to the instruction 144A.

As is shown in FIG. 1B, the system 100B includes a conveyor 131B, a server 132B, an imaging device 140B and a speaker 146B. A worker 150B is applying a visual cue 12B in the form of a symbol, viz., an icon corresponding to a dumbbell, onto the item 10B as the item 10B is placed onto the conveyor 131B. The imaging device 140B is configured to capture an image of the item 10B as the item 10B travels along the conveyor 131B with the visual cue 12B provided thereon. The server 132B is in communication with both the imaging device 140B and with the speaker 146B.

In accordance with the present disclosure, the visual cue 12B on the item 10B may be recognized in an image 142B captured using the imaging device 140B and provided to the server 132B. Once the visual cue 12B has been recognized, the server 132B may identify an instruction 144B associated with the visual cue 12B, viz., an audible signal requesting that two or more workers 150B receive the item 10B, and provide the instruction 144B to a speaker 146B. Subsequently, and in response to the instruction 144B, two or more workers 150B may be available to handle the item 10B.

Thus, by providing one or more visual cues on a temporary or permanent basis, an instruction may be presented to any type or form of industrial or commercial machine, e.g., one or more automobiles, components, engines, motors, vehicles or other pieces of equipment, by way of a digital camera or other imaging device in communication with the machine. The imaging device may capture the visual cues within images or other imaging data, and such cues may be recognized from the images or imaging data and associated with one or more tasks in general, or with one or more actions associated with the task in particular. Once the tasks or actions associated with the visual cues have been identified, instructions for performing the task or the actions may be automatically provided to the machine accordingly. Accordingly, the systems and methods of the present disclosure effectively enable automated machines to communicate by way of a language comprised of visual cues or visual patterns of visual cues, in a manner that may be readily understood by humans, as well.

Beginning at an early age, humans learn to communicate with one another using combinations of one or more written or spoken words. Written words are formed from one or more letters, and may be complemented by one or more symbols (e.g., punctuation marks) and/or numbers. One or more words may be combined into phrases or clauses, which may be further combined into one or more sentences or paragraphs, and such words or combinations thereof may be provided from one human to another, typically on paper or in an electronic format, such as short or multimedia messaging service (or "SMS" or "MMS") text messages or electronic mail (or "E-mail"). Spoken words are comprised of phonemes, or the smallest contrastive units in the sound system of a language, which describe the operation of voice articulators that is required in order to produce meaningful sounds. Speech typically begins with the generation of air pressure in the lungs, which causes vocal folds, or vocal cords, in the larynx to vibrate when vocal sounds are generated. Sound energy is therefore generated due to the vibration of the vocal folds, a release of built-up pressure, or turbulence caused by the rapid movement of air through narrow passages. Vowel sounds are generally characterized by an unblocked vocal tract and a lack of turbulence, while consonants may be formed from a variety of sound energy sources.

Thus, through written or spoken words, humans have for centuries been able to express one or more thoughts, opinions or instructions to one another, and to take various actions in response to such thoughts, opinions or instructions. Recently, efforts have been undertaken to enable computers to recognize one or more written or spoken words generated by humans, or to provide one or more written or spoken words to such humans in response. Since not long after advent of the modern computer, humans have provided instructions to computers via strokes of a keyboard, and for several years, software applications have been configured to perform one or more optical character recognition (or "OCR") techniques in order to recognize printed words expressed in images or computer documents. More recently, some software applications now enable users to speak into a microphone or other audio sensor, recognize one or more words within their speech, and display such words on a user interface or take one or more actions in response to such words.

Currently, however, computers may generally receive only singular instructions from humans for the performance of discrete tasks, and the means or processes for providing such instructions may be tedious and cumbersome. For example, providing text-based instructions to a computer typically requires a keyboard, while OCR techniques and speech recognition techniques may require specialized accessories or peripherals, and consume a substantial amount of processing power and/or bandwidth of a networked connection. Further, where instructions for performing multiple tasks are to be provided to a computer, the instructions must typically be provided iteratively, as computers are not typically equipped to adapt to changes in circumstances or conditions when performing such tasks, or to act in any manner other than in accordance with the instructions.

Many imaging devices, such as digital cameras, operate by capturing light that is reflected from objects, and subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, and store such data files in one or more onboard or accessible data stores (e.g., a digital video recorder, or "DVR"), as well as one or more removable data stores (e.g., flash memory devices), or displayed on one or more broadcast or closed-circuit television networks, or over a computer network as the Internet. Data files that are stored in one or more data stores may be printed onto paper, presented on one or more computer displays, or subjected to one or more analyses, such as to identify items expressed therein.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in a digital image, including colors, textures or outlines of the features or objects, may be extracted from the image in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Moreover, textures or features of objects expressed in a digital image may be identified using one or more computer-based methods, such as by identifying changes in intensities within regions or sectors of the image, or by defining areas of an image corresponding to specific surfaces. Furthermore, outlines of objects or features expressed in a digital image may be identified using one or more algorithms or machine-learning tools. Some such algorithms or tools may recognize edges, contours or outlines of objects or features in a digital image, or of portions of objects or features in the digital image, and may match the edges, contours or outlines of the objects or features against information regarding edges, contours or outlines of known objects or features, which may be stored in one or more data stores.

The systems and methods of the present disclosure are directed to recognizing one or more visual cues based on images or imaging data captured by an imaging device, associating such cues with one or more tasks, identifying one or more actions associated with such tasks, and providing an instruction for the performance of such actions. Further, the systems and methods may also identify a context associated with a visual cue, or a pattern of such visual cues, in order to identify a most appropriate task based on the visual cue or pattern, and to determine a most appropriate action pertaining to such a task. The context may be identified based on one or more attributes of the visual cue, an object associated with the visual cue, or an environment in which the object or the visual cue is provided.

Moreover, the performance of the task, or of one or more actions relating to the task, may be confirmed using the imaging device. In this regard, an automated system or unit may be visually programmed to perform a task by providing one or more visual cues, e.g., alone or in combination with one another, within a field of view of the imaging device. The visual cues would thus act as a programming interface, in conjunction with the imaging device, for providing instructions to the automated system or unit.

In accordance with the present disclosure, a visual cue is at least one sign or symbol that is readily observable and decipherable by imaging devices, and which conveys a unique and particular message in a given context. For example, a visual cue may comprise one or more letters, numbers or symbols of any type or form, including but not limited to a printed sign on a placard, a set of such signs or placards, an electronic display board, or even a uniquely identifiable pattern that naturally occurs within the given context. A visual pattern may be defined from one or more visual cues.

Each of the visual cues within a visual pattern of such cues may have an independent meaning. For example, in a fulfillment center environment, a first visual cue (e.g., an icon including an image of a thermometer with frozen water on a bulb thereof) may indicate that an object is under refrigeration, while a second visual cue (e.g., an icon including an image of a broken champagne glass) may indicate that an object is fragile, and a third visual cue (e.g., an icon including an arrow pointing upward) may indicate that an object must be stored with a specific face aligned vertically upward. Therefore, objects adorned with any one of the visual cues may require a task or an action to be performed that is consistent with the specific visual cue, e.g., an object bearing the first visual cue must be refrigerated, while an object bearing the second visual cue must be handled gently and an object bearing the third visual cue must be transported in a particular manner such that a specific face is pointed vertically upward. However, where an object bears two or more of the visual cues, the object may require each of the tasks or the actions associated with such visual cues to be performed. For example, an object bearing the first visual cue and the second visual cue must be refrigerated and handled gently, while an object bearing the second visual cue and the third visual cue must be handled gently and transported such that a specific face is pointed vertically upward.

In this regard, a visual cue, or a visual pattern of visual cues, may effectively act as one or more lines of code for communicating with an automated machine. A visual cue or a visual pattern of such cues may have a discrete meaning, optionally dependent upon a context in which the visual cue or visual pattern of such cues is provided. In this regard, every visual pattern may have a different meaning defined based on not only the individual visual cues within the visual pattern but also the spatial arrangement of such cues within the visual pattern, as well as an order in which such cues are provided. For example, a group of four different visual cues may have a first meaning when the visual cues are provided in a pattern such that the cues have a compact, close proximity to one another, and a second meaning when the visual cues are provided in a pattern such that the cues are spread out. Similarly, the four different visual cues may have a third meaning when the visual cues are provided in a polygonal arrangement (e.g., a square or other rectangle), and a fourth meaning when the visual cues are provided substantially collinearly (e.g., in a line).

Furthermore, a visual pattern may also comprise any number of visual cues appearing in an order or sequence. For example, a visual pattern may be defined based on a specific visual cue appearing at a first time, followed by another visual cue appearing at a second time and yet another visual cue appearing at a third time. Therefore, multiple visual patterns may be defined from the same group of visual cues, based on the times at which such visual cues appear, and the durations for which the visual cues are visually present. In this regard, visual cues, or visual patterns of visual cues, may operate in a manner similar to Morse code, such that not only the visual cues themselves but also the timing, locations and spatial arrangements with which such visual cues are provided may constitute separate indicia that may be identified and interpreted according to one or more of the systems and methods disclosed herein.

The systems and methods of the present disclosure provide many advantages over prior art systems for programming automated machines to perform one or more tasks. For example, many prior art systems are unable to incorporate user interaction into a programming process, and are unable to provide supervision or feedback to a user regarding the automated performance of the task. Further, such systems are typically based on heuristics, or pre-specified rules, and never endeavor to determine an intent of the programmer when implementing a program for the automated performance of a task.

Thus, the systems and methods of the present disclosure may be utilized in any number of operational applications in which the automated performance of tasks by machines is desired. Visual cues may be provided on any type or form of surface that may be aligned substantially vertically, horizontally or at any other angle. As one example, where a fulfillment center or like facility utilizes machines or autonomous mobile robots to carry out certain processes, e.g., moving one or more items in pallets or packages to a storage area or distribution station, the systems and methods disclosed herein may be provided to enable such machines or robots to initiate, manipulate or terminate such processes. In accordance with the present disclosure, processes may be begun upon the recognition and identification of a visual cue in one or more images or sets of imaging data, and following the association of the visual cue with the one or more processes. During the performance of one or more of the processes, however, a human may intervene and present a visual cue or visual pattern within a field of view of an imaging device, which may recognize the visual cue or visual pattern and alter or conclude one or more of the processes.

Additionally, the performance of multiple processes may be linked in series or in parallel based on the recognition of one or more visual cues. For example, where a first task for effecting a change on an environment is performed by an automated machine upon recognizing a visual cue, the automated machine may be configured to determine a condition in the environment upon a completion of the first task, based on the presence or absence of a visual cue or a visual pattern of visual cues. If the environment is in an intended condition following the performance of the first task, the automated machine may be configured to immediately initiate the performance of a second task. If the environment is not in the intended condition following the performance of the first task, however, the automated machine may be configured to immediately initiate the performance of a third task.

Moreover, the systems and methods of the present disclosure may be configured to utilize visual cues or visual patterns provided in natural or already existing configurations or states involving objects, human gestures and/or signage within a working environment, and need not operate based on artificially or intentionally provided visual cues or visual patterns. For example, any designated configuration or state of an object, a gesture or a sign within a fulfillment center or like facility may be identified and utilized as a visual cue or a visual pattern for initiating the performance of a task or one or more actions associated therewith. The systems and methods disclosed herein may thus be configured to recognize states or conditions of items being received, stored or prepared for delivery, as well as objects that are intentionally placed within a field of view of an imaging device by a human worker, which may cause a signal to be provided to a supervisor or other designated personnel.

Thus, the systems and methods disclosed herein may enable the creation and operation of automated systems or units through interactive compositions of individual visual components, e.g., imaging devices and/or associated computing devices, which may identify and recognize one or more visual cues or visual patterns thereof within images or imaging data, associate such visual cues or visual patterns with a task, identify actions required for the performance of the task, and provide instructions for performing one or more of the actions to one or more automated machines. The performance of such actions may be further specified, modified or controlled using intuitive visual instructions in the form of visual cues or visual patterns of such cues without requiring the manual programming of one or more automation controllers.

Figure 2A:
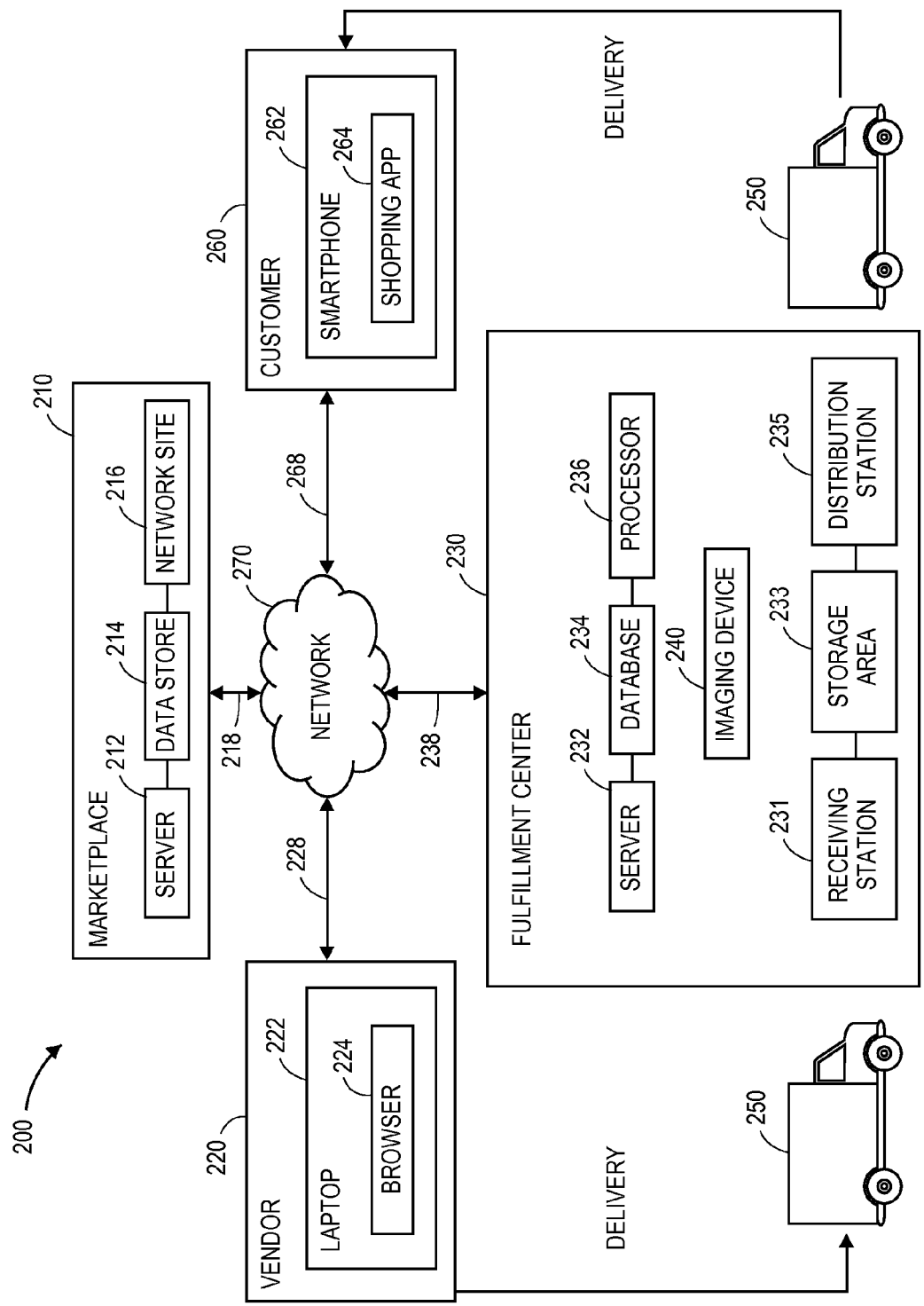
FIGS. 2A and 2B are views of a block diagram of components of one system for performing automated tasks based on visual cues in accordance with embodiments of the present disclosure.
Figure 2B:
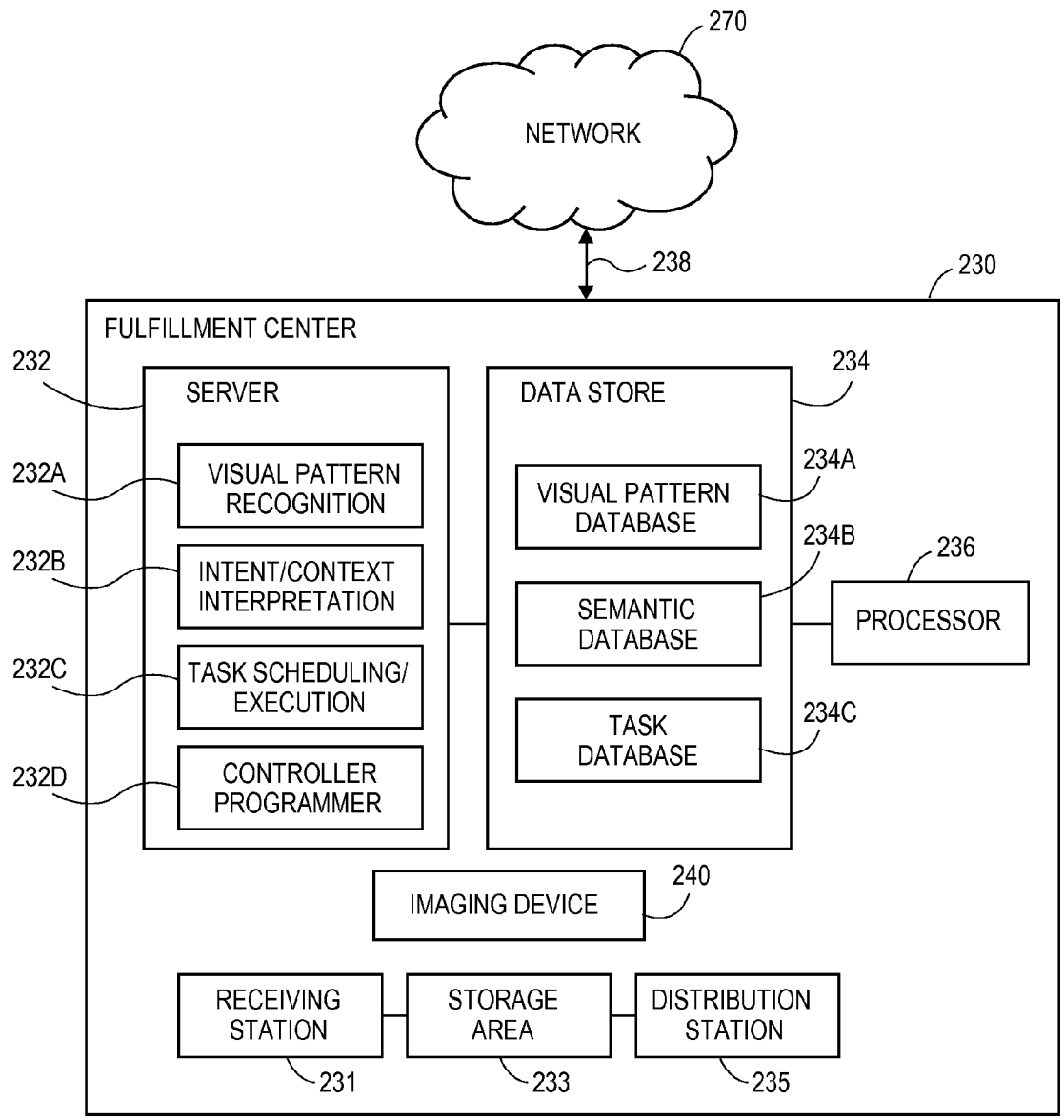

Referring to FIGS. 2A and 2B, a block diagram of components of one system 200 for performing automated tasks based on visual cues is shown. The system 200 includes a marketplace 210, a vendor 220, a fulfillment center 230 and a customer 260 that are connected to one another across a network 270, such as the Internet.

The marketplace 210 may be any entity or individual that wishes to make items from a variety of sources available for download, purchase, rent, lease or borrowing by customers using a networked computer infrastructure, including one or more physical computer servers 212 and data stores (e.g., databases) 214 for hosting a network site 216. The marketplace 210 may be physically or virtually associated with one or more storage or distribution facilities, such as the fulfillment center 230. The network site 216 may be implemented using the one or more servers 212, which connect or otherwise communicate with the one or more data stores 214 as well as the network 270, as indicated by line 218, through the sending and receiving of digital data. Moreover, the data stores 214 may contain any type of information regarding items that have been made available for sale through the marketplace 210, or ordered by customers from the marketplace 210.

The vendor 220 may be any entity or individual that wishes to make one or more items available to customers, such as the customer 260, by way of the marketplace 210. The vendor 220 may operate one or more order processing and/or communication systems using a computing device such as a laptop computer 222 and/or software applications such as a browser 224, which may be implemented through one or more computing machines that may be connected to the network 270, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230, e.g., by a truck 250. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIGS. 2A and 2B, the fulfillment center 230 includes a networked computer infrastructure for performing various computer-related functions associated with the receipt, storage, processing and distribution of such items, including one or more physical computer servers 232, databases (or other data stores) 234 and processors 236. The fulfillment center 230 may also include stations for receiving, storing and distributing items to customers or other destinations, such as one or more receiving stations 231, storage areas 233 and distribution stations 235. The fulfillment center 230 further includes at least one imaging device 240.

The fulfillment center 230 may further operate one or more order processing and/or communication systems using computer devices in communication with one or more of the server 232, the database 234 and/or the processor 236, or through one or more other computing devices or machines that may be connected to the network 270, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

The various components of the networked infrastructure within the fulfillment center 230 may be subdivided or partitioned, or include one or more modules, e.g., hardware components or software applications, for the purpose of executing or providing one or more functions or services described herein, or to achieve a specific set of results. As is shown in FIG. 2B, the server 232 may include or operate one or more modules thereon, including but not limited to a visual pattern recognition module 232A, an intent/content interpretation module 232B, a task scheduling/execution module 232C or a controller programmer module 232D. The visual pattern recognition module 232A may be configured to recognize a visual cue, or a pattern of visual cues, in real time or in near-real time based on imaging data captured using the imaging device 240. The intent/content interpretation module 232B may be configured to recognize and interpret an intent associated with a visual cue or pattern of visual cues, or identify a context of the visual cue or the pattern of visual cues based on one or more attributes of the visual cue or pattern of visual cues or an environment in which the visual cue or pattern of visual cues is provided. The task scheduling/execution module 232C may be configured to identify a task associated with a visual cue or pattern thereof, and to identify or schedule one or more actions for completing the task. The controller programmer module 232D may generate an execution program for transmitting instructions and performing the task or executing the actions.

In addition to the visual pattern recognition module 232A, the intent/content interpretation module 232B, the task scheduling/execution module 232C and/or the controller programmer module 232D, the server 232 may include any number of other modules for providing one or more functions or services therefor in accordance with the present disclosure.

The data store 234 may include one or more sections or partitions thereof for storing information or data regarding the performance of automated tasks based on visual cues. As is also shown in FIG. 2B, the data store 234 includes a visual pattern database 234A, a semantic database 234B and a task database 234C. The visual pattern database 234A comprises a virtual vocabulary of possible combinations of visual cues and/or visual patterns that may be encountered during operation of the system 200. For example, the visual pattern database 234A may be loaded with information regarding visual cues or combinations of such cues, as well as visual patterns. Alternatively, the visual pattern database 234A may be augmented with information or data regarding visual cues or visual patterns observed during operation.

The semantic database 234B includes information or data regarding the interdependence and relationships between various visual cues, or visual patterns of such cues, and the contexts in which such cues or patterns are provided. For example, the semantic database 234B may be trained to recognize associations between a visual cue or a visual pattern and a context, or between a context and a task or one or more actions associated with the task, according to one or more supervised or unsupervised learning methods, e.g., pattern classification, regression, clustering or the like, which may consider any attributes of the visual cues or the environments in which such visual cues are provided as inputs. The task database 234C comprises information or data regarding tasks that may be associated with visual cues or visual patterns thereof, as well as information or data regarding orders or priorities of execution of such tasks or component actions thereof. For example, the task database 234C may also be loaded with information regarding tasks or actions associated with such tasks, or augmented with further information or data regarding such tasks or actions that may be observed during operation.

The fulfillment center 230 may also include one or more receiving stations 231. A receiving station 231 may include any apparatuses required to receive shipments of items from one or more sources and/or through one or more channels, and prepare such items for storage or distribution to customers. Such apparatuses include, but are not limited to, docks, lifts, cranes, jacks, belts or other conveying apparatuses for obtaining items and/or shipments of items from carriers such as cars, trucks, trailers, freight cars, container ships or cargo aircraft (e.g., manned or unmanned aircraft, such as drones).

A storage area 233 at the fulfillment center 230 may include one or more predefined two-dimensional or three-dimensional spaces for accommodating items and/or containers of such items, such as shelves, bins, lockers, cubbies or any other appropriate areas or spaces. A distribution station 235 at the fulfillment center 230 may include one or more areas, spaces or stations where items that have been retrieved from a designated storage area may be evaluated, prepared and packed for delivery to addresses, locations or destinations specified by customers.

The fulfillment center 230 may also include one or more workers or staff members, e.g., pickers or sorters, who handle or transport items within the fulfillment center 230 (not shown). For example, such workers may remove items from an item carrier, place the items onto a crane, jack, belt or another conveying apparatus at the receiving station 231; transport the items to a shelf, bin, rack, tier, bar, hook or other storage means within the storage area 233; retrieve the items from such a storage means within the storage area 233; transport the items to a defined space within the distribution station 235; prepare the items for delivery to one or more customers; and place the items onto an item carrier. According to one embodiment, workers may also transport, or "cross-dock," items directly from the receiving station 231 to the distribution station 235.

Moreover, workers may also operate one or more computing devices for registering the receipt, retrieval, transportation or storage of items within the fulfillment center, such as devices that are specifically programmed or adapted for such purposes, or a general purpose device such a personal digital assistant, a digital media player, a smartphone, a tablet computer or a laptop computer, and may include any form of input and/or output peripherals such as scanners, readers, keyboards, keypads, touchscreens or pointing devices. Workers within the fulfillment center 230 may also register their possession of an item at any time, including after obtaining the item from a shelf or other storage means within the storage area 233, placing the item into one or more containers for transportation to the distribution station 235, retrieving the item from the one or more containers at the distribution station 235, or placing the item onto one or more item carriers.

The imaging device 240 may be any form of optical recording device that may be used to photograph or otherwise record images of structures, facilities or other elements within the fulfillment center 230, as well as the items within the fulfillment center 230, or for any other purpose. Such imaging devices 240 may capture one or more still or moving images, as well as any relevant audio signals or other information, within one or more designated locations within the fulfillment center 230, and may be connected to the server 232 or with one another by way of an internal network (not shown). Additionally, the imaging devices 240 may be adapted or otherwise configured to communicate with one another, or with the marketplace 210 or the marketplace server 212, the vendor 220 or the vendor laptop 222 or the customer 260 or customer smartphone 262, or to access one or more other computer devices by way of the network 270. Although the fulfillment center 230 of FIGS. 2A and 2B includes a single box corresponding to one imaging device 240, any number or type of imaging devices may be provided in accordance with the present disclosure, including but not limited to digital cameras or other optical sensors.

The customer 260 may be any entity or individual that wishes to download, purchase, rent, lease, borrow or otherwise obtain items (e.g., goods, products, services or information of any type or form) from the marketplace 210. The customer 260 may utilize one or more computing devices, such as a smartphone 262 or any other like machine that may operate or access one or more software applications, such as a web browser (not shown) or a shopping application 264, and may be connected to or otherwise communicate with the marketplace 210, the vendor 220 or the fulfillment center 230 through the network 270, as indicated by line 268, by the transmission and receipt of digital data. Moreover, the customer 260 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," an "imaging device" or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," an "imaging device" or a "customer" may be typically performed by a human operator, but could, alternatively, be performed by an automated agent.

The marketplace 210, the vendor 220, the fulfillment center 230 and/or the customer 260 may use any web-enabled or Internet applications or features, or any other client-server applications or features including E-mail or other messaging techniques, to connect to the network 270 or to communicate with one another, such as through SMS or MMS text messages. For example, the server 232 may be adapted to transmit information or data in the form of synchronous or asynchronous messages from the fulfillment center 230 to the laptop computer 222, the server 212, the smartphone 262 or any other computer device in real time or in near-real time, or in one or more offline processes, via the network 270. Those of ordinary skill in the pertinent art would recognize that the marketplace 210, the vendor 220, the fulfillment center 230 or the customer 260 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232 or the smartphone 262, or any other computers or control systems utilized by the marketplace 210, the vendor 220, the fulfillment center 230 or the customer 260 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference providing visual cues or visual patterns within a fulfillment center environment, and recognizing such visual cues or visual patterns, identifying at least one task associated with such visual cues or patterns, or providing instructions for executing actions pertaining to the at least one task within the fulfillment center environment, the systems and methods are not so limited. Rather, the systems and methods disclosed herein may be utilized in any environment in which the automated operation of a system based on visual programming through visual cues or visual patterns is desired.

Figure 3:
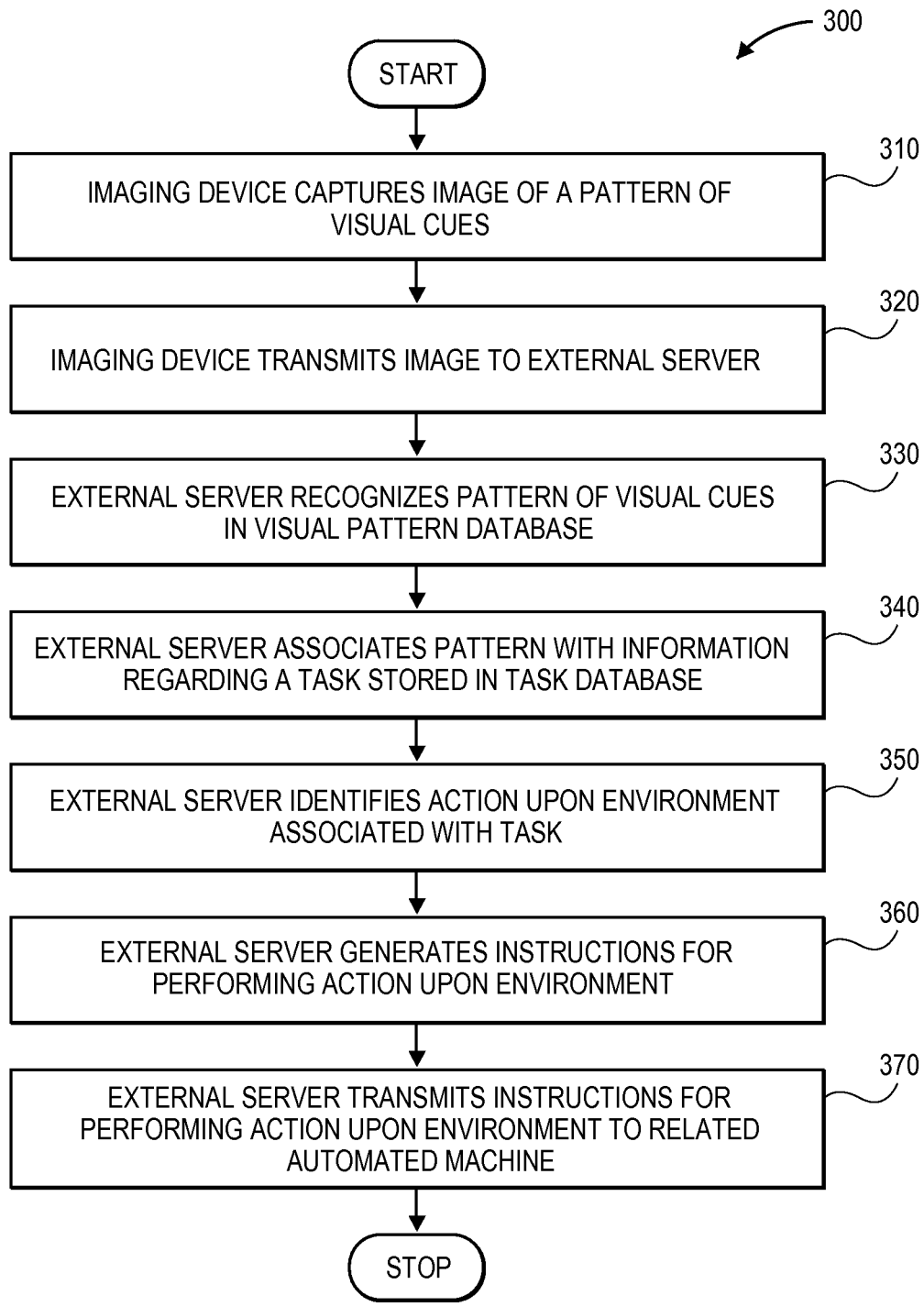
FIG. 3 is a flow chart of one process for performing automated tasks based on visual cues in accordance with embodiments of the present disclosure.

Referring to FIG. 3, a flow chart 300 representing one embodiment of a process for performing automated tasks based on visual cues in accordance with embodiments of the present disclosure is shown. At box 310, an imaging device captures an image of a pattern of visual cues. For example, the visual cues may include one or more letters, numbers, symbols, icons, logos or other like labels or markings disposed on at least one surface of an object, a structure or a machine, in any color and of any size, as well as edges, contours or outlines of a shape that may be expected to be encountered within an environment in which the imaging device is provided. At box 320, the imaging device transmits the image to one or more external servers.

At box 330, the external server recognizes the pattern of visual cues included in the image captured at box 310 within a visual pattern database. For example, a database or other data store in communication with the external server, e.g., the server 232 and the visual pattern database 234A of FIG. 2B, may contain information or data for identifying a visual cue or a pattern of such cues, including but not limited to the one or more letters, numbers, symbols, icons, logos or other like labels or markings, as well as edges, contours or outlines of shapes. At box 340, the external server associated the pattern with information regarding a task stored in a task database. For example, a database or other data store in communication with the external server, e.g., the server 232 and the task database 234C of FIG. 2B, may contain actions, steps, predicate conditions or any relevant information or data concerning a task with which the pattern recognized at box 330 may be associated.

At box 350, the external server identifies an action to be taken upon the environment in which the visual cue or the visual pattern was provided, and at box 360, the external server generates instructions for performing the action identified at box 350. For example, the action may include the operation of a particular machine or piece of equipment for the purpose of exacting a change within the environment, e.g., transferring the item 10A from the first conveyor 131A into the cart 150A using the diverter 146A of FIG. 1A. At box 370, the external server transmits the instructions for performing the action upon the environment to at least one related component, and the process ends. For example, referring again to FIG. 1A, the server 132A may transmit at least one instruction to the diverter 146A, causing the diverter 146A to direct the item 10A into the cart 150A upon an arrival of the item 10A on the first conveyor 131A.

The visual cues that may be recognized and associated with one or more tasks in accordance with the present disclosure may take any shape or form, and may include any number of letters, numbers, symbols, icons, logos or other like labels or markings, as well as edges, contours or outlines of shapes, alone or in combination with one another. For example, the visual cues may be artificially or intentionally defined and/or provided for a specific purpose, e.g., a temporary or permanent marking of an icon on an object, a structure or a machine or a structure. Once the systems and methods of the present disclosure recognize a predefined visual cue or visual pattern of such cues in images or imaging data, the visual cue or visual pattern may be associated with a given task, and one or more actions associated with the task may be undertaken. Alternatively, the systems and methods of the present disclosure may be configured to recognize one or more visual cues that appear naturally, e.g., during normal operations in accordance with an industrial or commercial process, and to take one or more actions related to an associated task accordingly.

Figure 4:
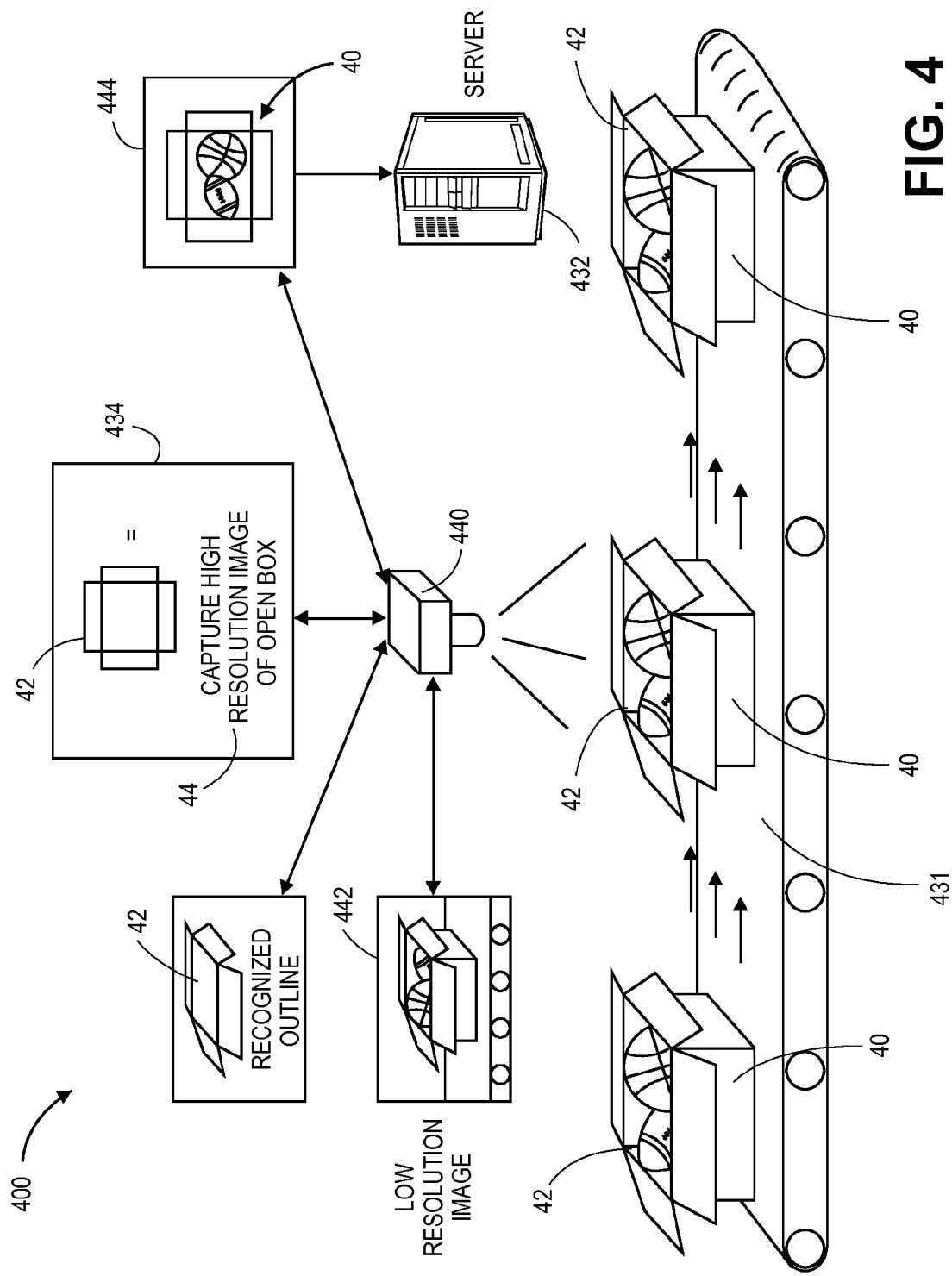
FIG. 4 is a view of components of one system for performing automated tasks based on visual cues in accordance with embodiments of the present disclosure.

Referring to FIG. 4, components of one system 400 for performing automated tasks based on visual cues in accordance with embodiments of the present disclosure are shown. Except where otherwise noted, reference numerals preceded by the number "4" shown in FIG. 4 indicate components or features that are similar to components or features having reference numerals preceded by the number "2" shown in FIG. 2A or 2B, or by the number "1" shown in FIG. 1A or 1B.

The system 400 includes a first conveyor 431, a server 432 and an imaging device 440. A box 40 or other container including one or more items therein is provided on the conveyor 431. As is shown in FIG. 4, the box 40 is opened, and an outline 42 including four axially aligned rectangles sharing common corners with one another is formed from flaps of the opened box 40. The server 432 is in communication with the imaging device 440, which is configured to capture one or more images or sets of imaging data of objects, e.g., the object 40, as such objects travel along the conveyor 431.

As is shown in FIG. 4, the imaging device 440 may capture an image 442 of the box 40 and the items therein, e.g., a low-resolution image, and transmit the image 442 to a server 432 for analysis. The image 442 may include at least a portion of the outline 42 formed by the flaps of the opened box 40. The server 432 may process the image 442, recognize the outline 42 therein, and compare the outline 42 to information or data regarding one or more tasks that may be stored in a data store 434. Based on the image 442, the server may associate the outline 42 with a task 44, viz., a requirement to capture a high-resolution image when a box is identified as open based on the outline, the server 432 transmits an instruction to the imaging device 440 to capture a high-resolution image of the box 40 and the items therein. The imaging device 440 then captures the image 444 of the opened box 40 and transmits the image 444 to the server 432 for analysis.

Accordingly, the recognition of a visual cue or pattern of visual cues that may appear on an artificial or intentional basis, or naturally in accordance with one or more processes or environments, may lead to the performance of one or more tasks or actions associated therewith in accordance with the present disclosure.

As is discussed above, once a visual cue or visual pattern of visual cues has been recognized, the systems and methods of the present disclosure may determine a context in which the visual cue or visual pattern has been provided or identified, and may identify a task or one or more actions associated with the task based on the context. In this regard, a machine may be configured to perform one or more different tasks upon recognizing the same visual cue or visual pattern (e.g., letters, numbers or symbols, or combinations of such letters, numbers or symbols) that may be provided in different contexts.

Figure 5:
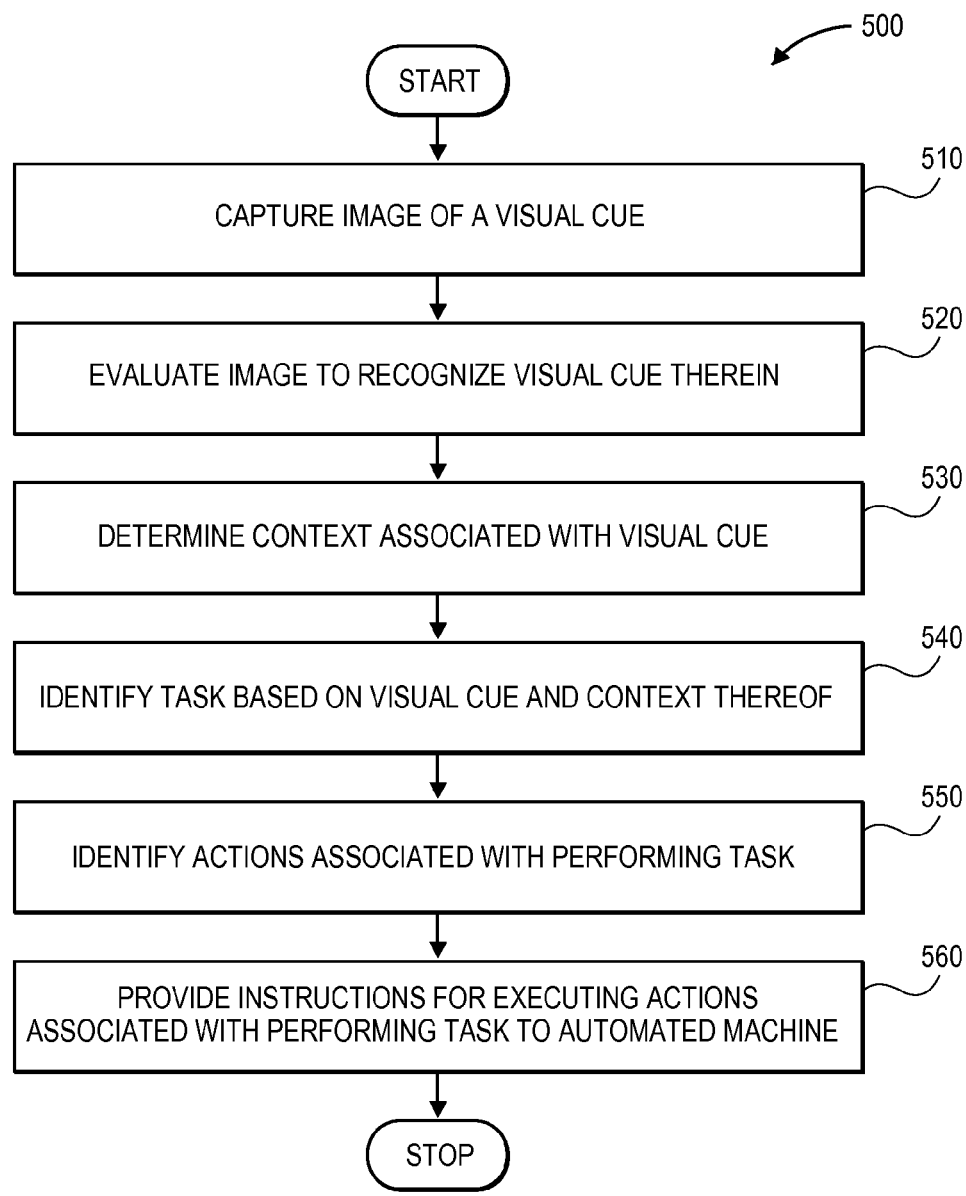
FIG. 5 is a flow chart of one process for performing automated tasks based on visual cues in accordance with embodiments of the present disclosure.

Referring to FIG. 5, a flow chart 500 representing one embodiment of a process for performing automated tasks based on visual cues in accordance with embodiments of the present disclosure is shown. At box 510, an image of a visual cue, e.g., one or more letters, numbers, symbols, icons, logos or other like labels or markings, as well as edges, contours or outlines of shapes, is captured, and at box 520, the image is evaluated to recognize the visual cue therein. As is discussed above, the visual cue may be provided alone or in combination with one or more other visual cues, and may appear artificially or intentionally for the purpose of triggering a given action or task, or naturally in a given environment.

At box 530, a context associated with the visual cue is identified. The context may be identified based at least in part on an attribute of the visual cue, or of a visual pattern of which the visual cue is a part. Additionally, the context may be identified based at least in part on an attribute of an object with which the visual cue is associated, or an environment in which the visual cue and/or the object are provided, or a combination of such attributes. For example, where an imaging device or one or more like components or related devices is provided at a traffic intersection, the visual cue may be associated with the safety and health of pedestrians or operators of vehicles. Where the imaging device or other components are provided in a shopping center, the visual cue may be associated with the purchase and sale of commercial items. Those of ordinary skill in the pertinent arts will recognize that the systems and methods disclosed herein may be provided in any context in which the recognition of visual cues or visual patterns of such cues is desired, and are not limited to any of the specific contexts described or suggested herein.

At box 540, a task is identified based on the visual cue and the context thereof. Any given visual cue, or visual pattern of such cues, may be associated with multiple tasks or actions associated therewith. For example, where a triangle is identified at a traffic intersection, the triangle may be associated with a "yield" sign, and a task relating to yield signs or yielding responsibilities at traffic intersections may be identified. Where a triangle is identified in a vicinity of a patron of a pub or recreation hall, the triangle may be associated with a pool rack for racking billiard balls, and a task associated with commencing a game of pool or billiards may be identified.

At box 550, one or more actions associated with the performance of the task identified at box 540 may be identified. For example, where a visual cue including an International Symbol of Access, e.g., the "handicapped persons" symbol, has been recognized in an image taken in a parking garage, and in the context of parking enforcement, a task of determining whether a parked car within a parking space adorned with the International Symbol of Access is authorized to park there may be identified. Actions associated with this determination may include, but are not limited to, capturing a photograph of the parked car, recording a license plate number or other identifier on the parked car, evaluating the license plate number or other identifier, and other like actions. Where the same International Symbol of Access is provided in an image of an elevator, and in the context of facilities maintenance, a task of determining whether any maintenance to the elevator is required, and actions associated with this determination may include, but are not limited to, accessing an operating history of the elevator, determining the conductivity and operability of the lights or other electronic components of the elevator, as well as any levels of hydraulic fluid, and scheduling maintenance operations to address any deficiencies that may be identified.

At box 560, instructions for executing the actions for performing the task identified at box 550 may be provided, e.g., to one or more computer devices or machines associated with such computer devices, and the process ends.

Figure 6A:
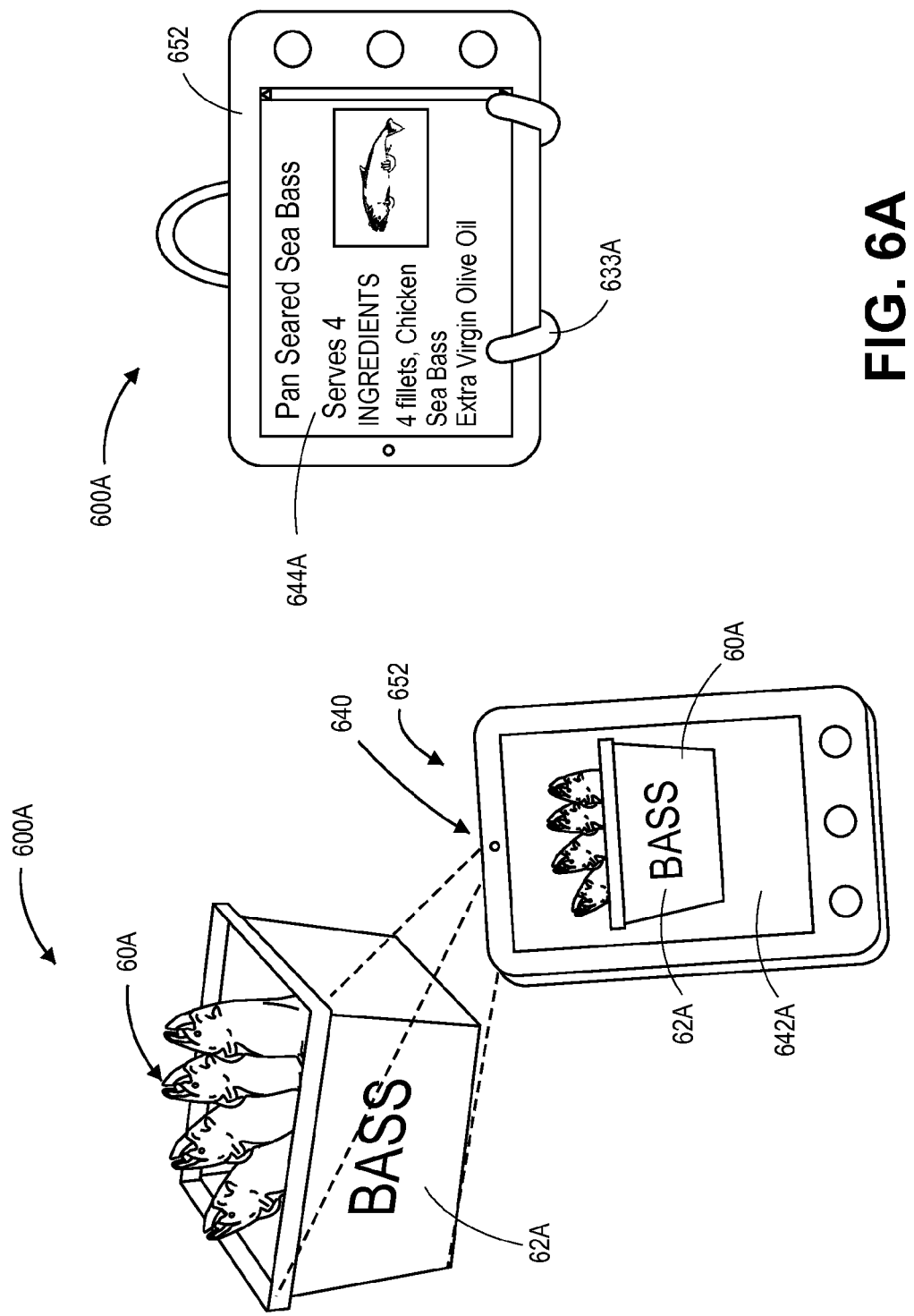
FIGS. 6A and 6B are views of components of systems for performing automated tasks based on visual cues in accordance with embodiments of the present disclosure.
Figure 6B:
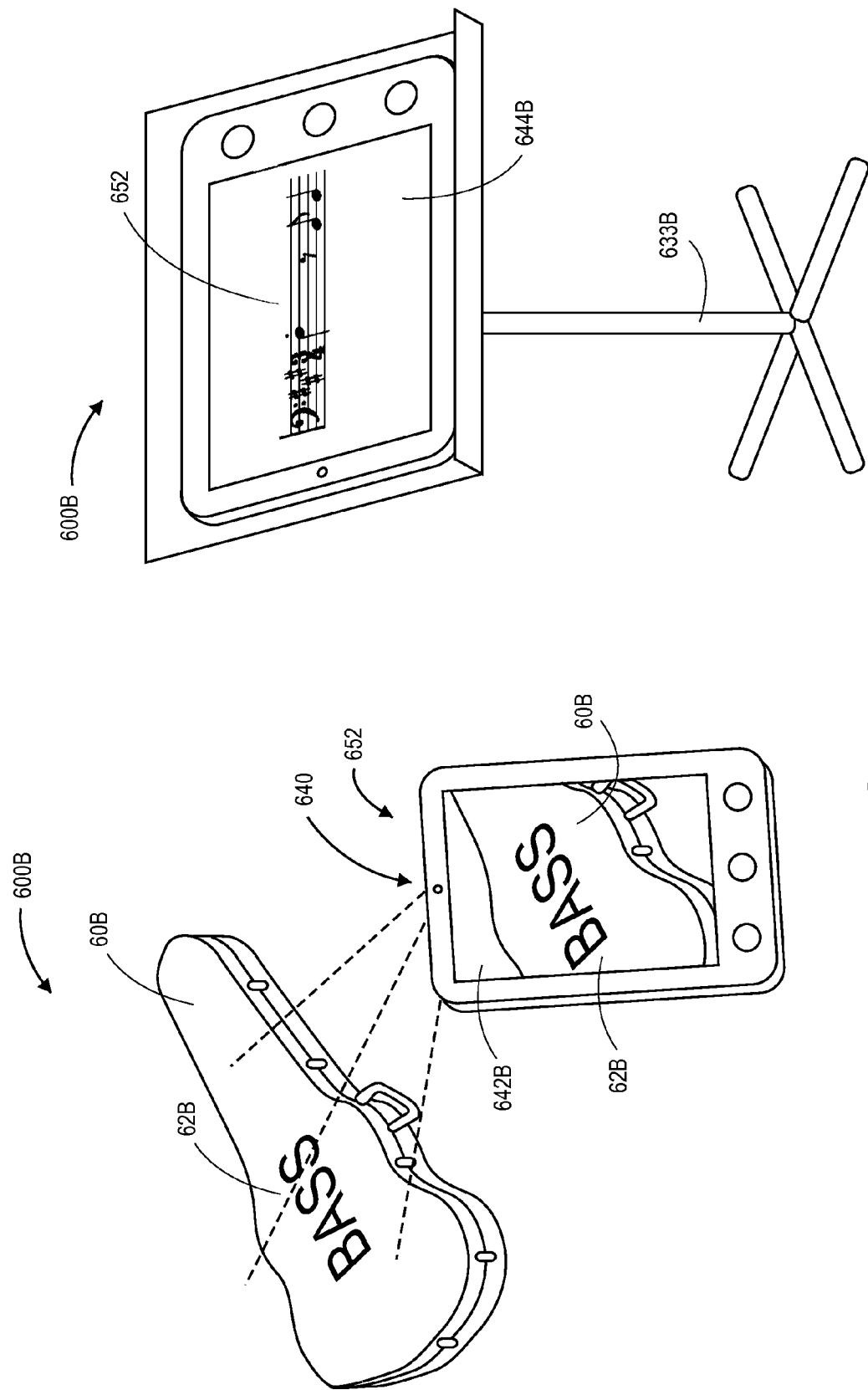

Therefore, in accordance with the present disclosure, recognizing the same visual cues or visual patterns of such cues may lead to the automated performance of different actions associated with different tasks. One example of the capacity of systems and methods of the present disclosure to recognize the same visual cues or visual patterns thereof, and to associate the visual cues or visual patterns with different tasks, may be shown with regard to FIGS. 6A and 6B. Referring to FIGS. 6A and 6B, views of components of systems 600A, 600B for performing automated tasks based on visual cues in accordance with embodiments of the present disclosure are shown. Except where otherwise noted, reference numerals preceded by the number "6" shown in FIG. 6A or 6B indicate components or features that are similar to components or features having reference numerals preceded by the number "4" shown in FIG. 4, by the number "2" shown in FIG. 2A or 2B, or by the number "1" shown in FIG. 1A or 1B.

As is shown in FIG. 6A, the system 600A includes an object 60A, viz., a bin containing fish, a smartphone 652 having an imaging device 640, and an easel 633A. The object 60A includes a visual cue 62A in the form of an identifier of the fish contained therein, viz., "BASS," marked thereon. When a user of the smartphone 652 captures an image 642A of the object 60A which includes the visual cue 62A, the systems and methods of the present disclosure may identify a context in which the visual cue 62A is provided, e.g., on a surface of a bin containing fish, and may identify a task associated with both the context and the visual cue 62A, e.g., a recipe for cooking the fish included in the bin. As is also shown in FIG. 6A, a user interface 644A bearing a recipe for cooking Pan Seared Sea Bass, a recipe related to the visual cue 62A and the context in which the visual cue 62A was provided, is displayed on the smartphone 652, which is positioned on the easel 633A.

As is shown in FIG. 6B, the system 600B includes an object 60B, viz., a guitar case, the smartphone 652 and a music stand 633B. The object 60B includes a visual cue 62B in the form of an identifier of the type of guitar contained therein, viz., "BASS," marked thereon. When a user of the smartphone 652 captures an image 642B of the object 60B which includes the visual cue 62B, the systems and methods of the present disclosure may identify a context in which the visual cue 62B is provided, e.g., in association with a musical instrument, and may identify a task associated with both the context and the visual cue 62B, e.g., a sheet of music to be played using the musical instrument included in the guitar case. As is also shown in FIG. 6B, a user interface 644B bearing music to be played using a bass guitar, which is related to the visual cue 62B and the context in which the visual cue 62B was provided, is displayed on the smartphone 652, which is positioned on the music stand 633B.

Therefore, in accordance with the present disclosure, and as is shown in FIGS. 6A and 6B, the same visual cue 62A, 62B, viz., the word "BASS," may be provided on different objects 60A, 60B in different contexts, and may be recognized using the same computer device, viz., the smartphone 652. Once the visual cue 62A, 62B has been recognized in each such context, the visual cue 62A, 62B may be associated with tasks relating to both the visual cue 62A, 62B and the respective context, and actions pertaining to such tasks may be undertaken. Although FIGS. 6A and 6B show the display of rendered content on user interfaces 644A, 644B on the smartphone 652 upon recognizing a word, those of ordinary skill in the pertinent arts will recognize that any automated task may be undertaken upon recognizing any type or form of visual cues by any type of device in accordance with the present disclosure, which are not limited to the automated display of networked content.

As is discussed above, the systems and methods of the present disclosure are directed to identifying and recognizing visual cues or visual patterns of such cues from images or other imaging data captured using an imaging device, such as a digital camera, as well as the identification of one or more tasks or actions associated with such tasks based on the visual cues, and causing the performance of such tasks or the execution of such actions accordingly. Additionally, the systems and methods of the present disclosure may be further directed to confirming the performance of the tasks or the execution of one or more individual actions, e.g., using further images or imaging data captured using the imaging device used to identify the visual cues or visual patterns or another imaging device.

Figure 7:
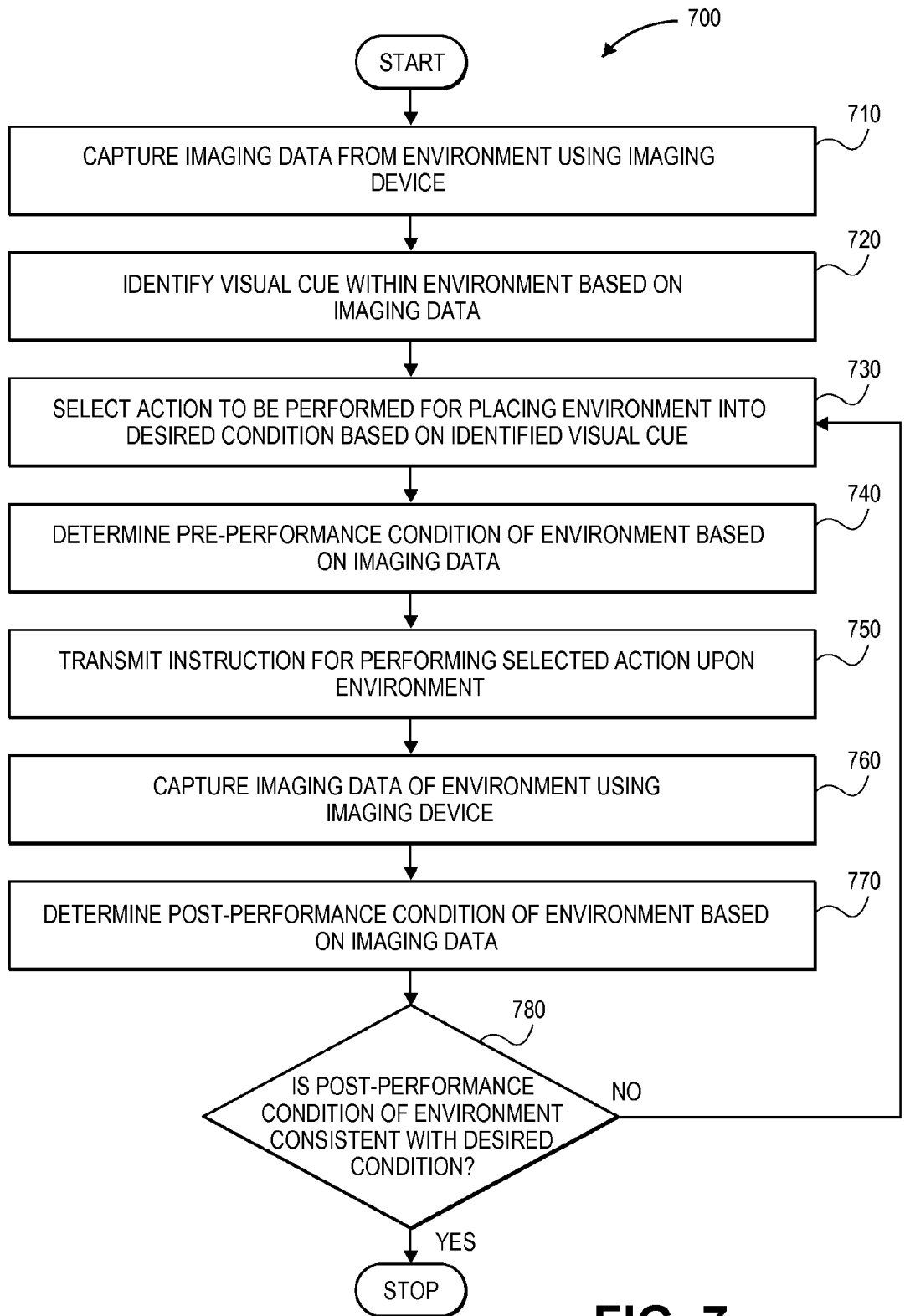
FIG. 7 is a flow chart of one process for performing automated tasks based on visual cues in accordance with embodiments of the present disclosure.

Referring to FIG. 7, a flow chart 700 representing one embodiment of a process for performing automated tasks based on visual cues in accordance with embodiments of the present disclosure is shown. At box 710, imaging data is captured from an environment using an imaging device. The environment may include, but is not limited to, any industrial or commercial environment in which an imaging device may be deployed for the purpose of recognizing visual cues or visual patterns of such cues. For example, referring again to FIG. 1A, the imaging device 140A may capture one or more images or other data regarding the item 10A as the item 10A travels down the first conveyor 131A. At box 720, a visual cue is identified within the environment based on imaging data. The visual cue may be artificially or intentionally provided for a given purpose, or may naturally occur within the environment. For example, the visual cue may be intentionally provided by a human operator, e.g., presented within a field of view of an imaging device, or affixed to a surface of an object, or may be automatically recognized as all or a portion of a surface of the object. Additionally, the visual cue may be naturally present within the environment, without any deliberate action taken by a human operator, e.g., the outline 42 of the box 40 of FIG. 4.

At box 730, an action to be performed for placing the environment into a desired condition based on the identified visual cue is selected. The selected action may be directed to cause a change in any aspect of the environment using one or more automated machines. At box 740, a pre-performance condition of the environment is determined based on the imaging data captured at box 710. For example, where an action is intended to deposit an item into a predetermined storage vessel or facility, a condition of the item (e.g., a location of the item) or a condition of the storage vessel or facility (e.g., a capacity of the vessel or facility) may be determined. At box 750, an instruction for performing the selected action upon the environment is transmitted to an automated machine, which may be or include any form of automobile, component, engine, motor, vehicle or like machine or piece of equipment connected to a networked computer or having an automated controller associated therewith that is configured to receive instructions for performing one or more tasks.

At box 760, imaging data relating to the environment is captured using the imaging device, and at box 770, a post-performance condition of the environment is determined based on the imaging data. For example, where the imaging device captured imaging data from which a condition of the environment prior to the performance of a selected action was determined, the imaging device may capture imaging data regarding a condition of the environment following the performance of the selected action.

At box 780, whether the post-performance condition of the environment is consistent with the desired condition of the environment following the performance of the selected action is determined. By comparing the condition of the environment following the performance of the selected action to the desired condition, the efficacy of the selected action in achieving an intended result may be determined. If the post-performance condition of the environment is not consistent with the desired condition, then the process returns to box 730, where an action to be performed for placing the environment into a desired condition based on the identified visual cue is selected. If the post-performance condition of the environment is consistent with the desired condition, however, then the process ends.

Figure 8A:
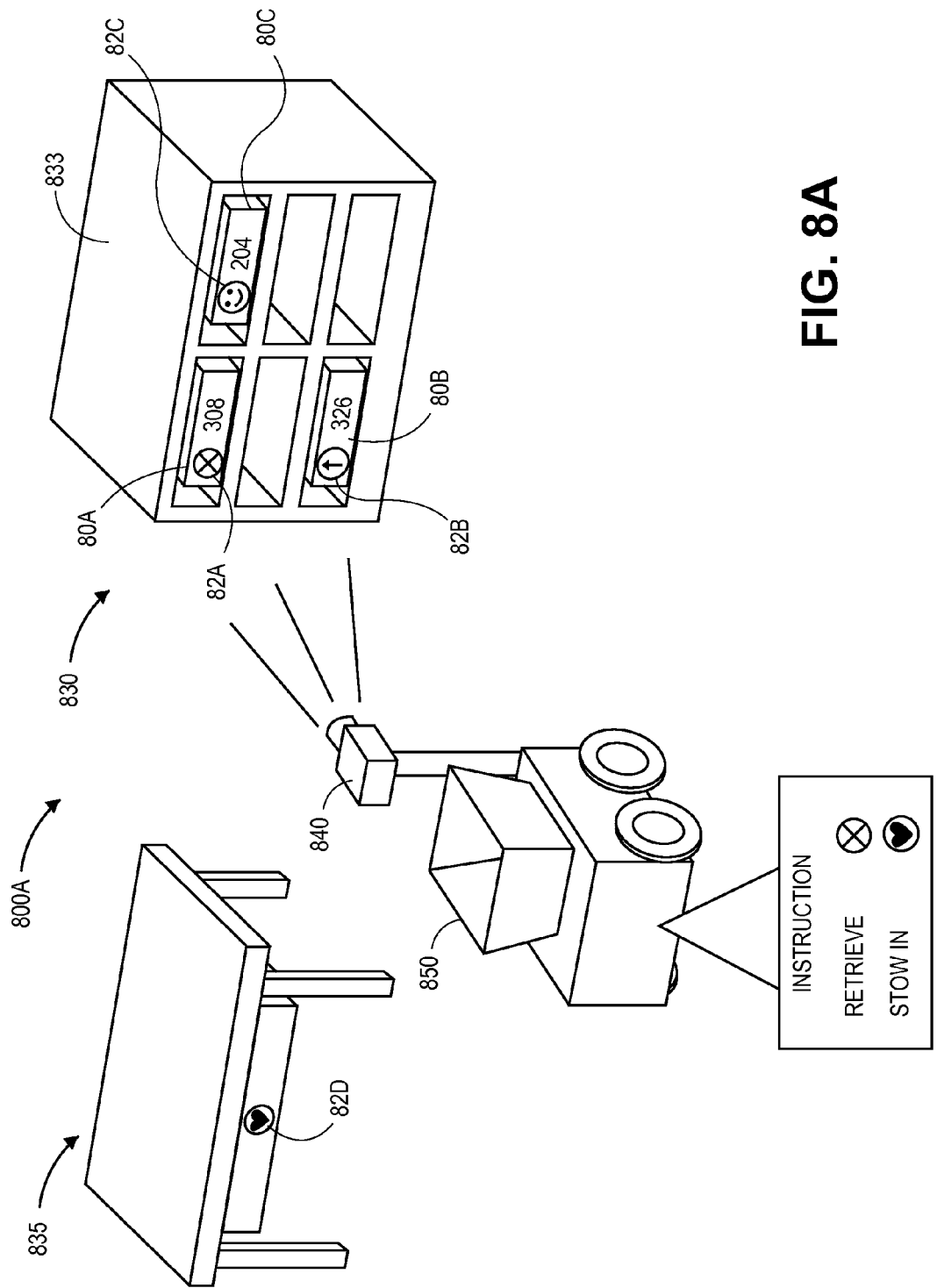
FIGS. 8A and 8B are views of components of one system for performing automated tasks based on visual cues in accordance with embodiments of the present disclosure.
Figure 8B:
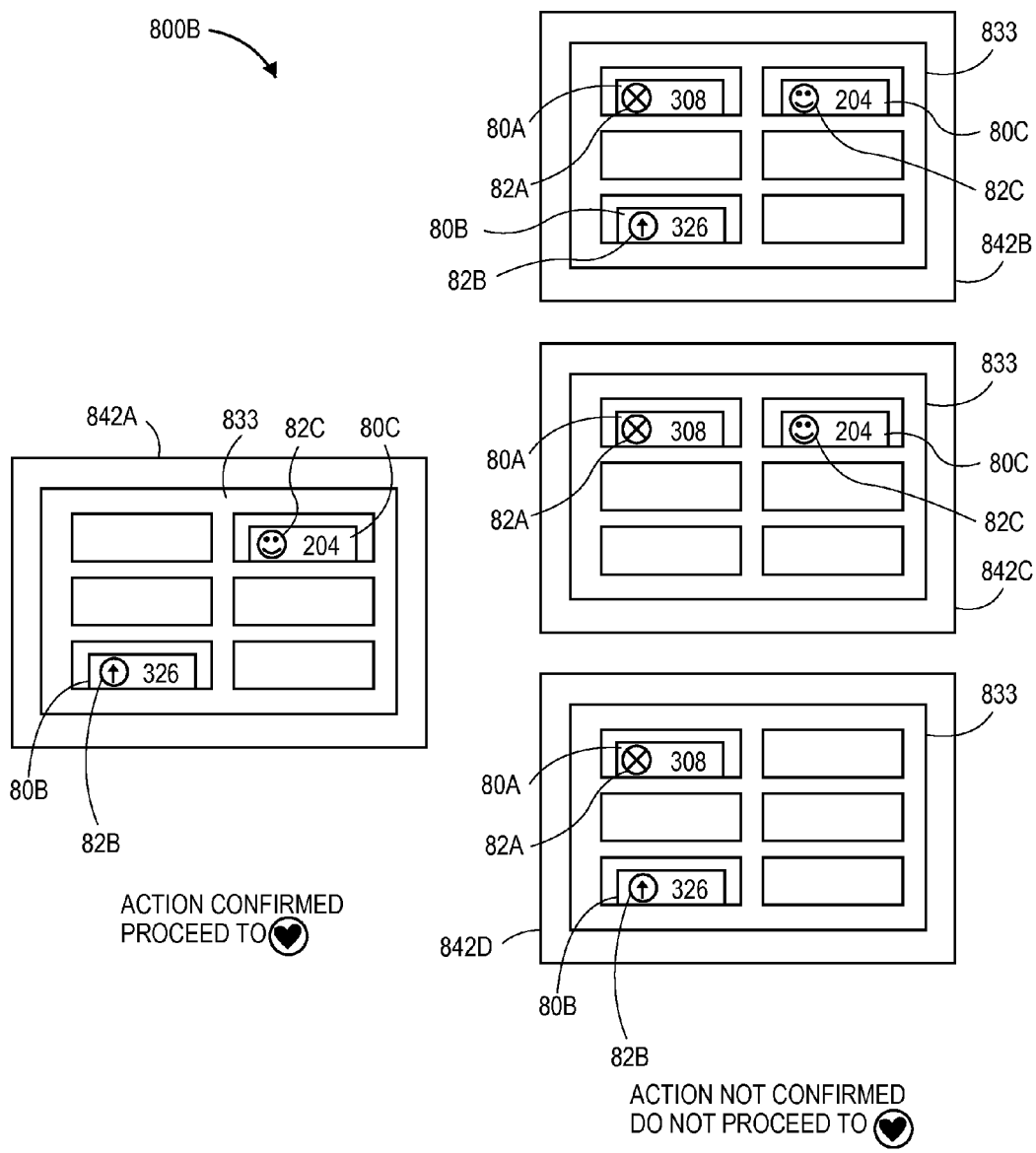

Accordingly, images and imaging data may be used not only to identify a task to be performed based on a visual cue expressed in the images or the imaging data but also to confirm that the task and any associated actions have been successfully performed. Referring to FIGS. 8A and 8B, components of one system 800A for performing automated tasks based on visual cues and images 800B captured by the system 800A in accordance with embodiments of the present disclosure are shown. Except where otherwise noted, reference numerals preceded by the number "8" shown in FIG. 8A or 8B indicate components or features that are similar to components or features having reference numerals preceded by the number "6" shown in FIG. 6A or 6B, by the number "4" shown in FIG. 4, by the number "2" shown in FIG. 2A or 2B, or by the number "1" shown in FIG. 1A or 1B.

As is shown in FIG. 8A, the system 800A includes a fulfillment center 830 having a storage facility 833, a table or working surface 835 and an autonomous mobile robot 850 having an imaging device 840 mounted thereon. The storage facility 833 includes a plurality of items 80A, 80B, 80C therein. Each of the items 80A, 80B, 80C shown in the storage facility 833 of FIG. 8A includes a visual cue 82A, 82B, 82C marked thereon. Additionally, the table 835 further includes a visual cue 82D marked thereon. The autonomous mobile robot 850 may include any type or form of computer components or devices (not shown) for controlling operations of the autonomous mobile robot or the imaging device 840, and, as is shown in FIG. 8A, is aligned to enable the imaging device 840 to capture imaging data regarding the storage facility 833 and the contents thereof.

In accordance with the present disclosure, an automated machine, such as the autonomous mobile robot 850 of FIG. 8A, may be programmed to perform an action based on the recognition of one or more visual cues. For example, as is shown in FIG. 8A, the autonomous mobile robot 850 may be commanded to retrieve an item bearing an "X" within a circle from the storage facility 833, and to deposit the item bearing the "X" at a workstation bearing a heart within a circle. The autonomous mobile robot 850 may thus capture a first image or a first set of imaging data regarding a condition of an environment in which the autonomous mobile robot 850 was located, viz., a front face of the storage facility 833, using the imaging device 840. Based on the image or the imaging data, the autonomous mobile robot 850 may identify a location of the item bearing the "X" within the circle, viz., item 80A, inside the storage facility 833, as well as a location of the workstation bearing the heart within the circle, viz., the table 835. Subsequently, the autonomous mobile robot 850 may retrieve the item 80A from the storage facility 833.

Once the autonomous mobile robot 850 has determined that it has retrieved the item 80A from the storage facility 833, the autonomous mobile robot 850 may capture a second image or a second set of imaging data regarding a condition of the environment following the performance of the action, prior to proceeding to the table 835. If the second image or the second set of imaging data indicate that the condition of the environment is consistent with the performance of the action, then the autonomous mobile robot 850 may confirm that the action has been performed based on the presence or absence of one or more visual cues and may, for example, proceed to deposit the item at the workstation bearing the heart within a circle, viz., the table 835.

Referring to FIG. 8B, a set 800B of images 842A, 842B, 842C, 842D is shown. As is shown in FIG. 8B, the set 800B includes an image 842A corresponding to an environment in which the performance of the action is confirmed, viz., where the storage facility 833 includes the item 80B and the item 80C, but does not include the item 80A, indicating that the performance of the action by the autonomous mobile robot resulted in the retrieval of the item bearing the visual cue 80A and not either of the items bearing the visual cue 80B or the visual cue 80C.

As is also shown in FIG. 8B, the set 800B includes images 842B, 842C, 842D corresponding to environments in which the performance of the action may not be confirmed. The image 842B indicates that the storage facility 833 includes each of the visual cues 82A, 82B, 82C, and that the performance of the action did not result in the retrieval of any of the items 80A, 80B, 80C, respectively. The image 842C indicates that the storage facility 833 includes the visual cues 82A, 82C, but not the visual cue 82B, thereby confirming that the performance of the action resulted in the retrieval of the item 80B but did not result in the retrieval of the item 80A. The image 842D indicates that the storage facility 833 includes the visual cues 82A, 82B, but not the visual cue 82C, thereby confirming that the performance of the action resulted in the retrieval of the item 80C but did not result in the retrieval of the item 80A.

Although some of the embodiments described herein describe specific systems or methods for capturing images or imaging data from objects within one or more aspects of a fulfillment center environment, the systems and methods of the present disclosure are not so limited, and may be used with any systems and methods for accomplishing the results disclosed herein. Additionally, such systems or methods may be used in series or in parallel, and independently or in conjunction with one another, in accordance with the present disclosure.

As is discussed above, the systems and methods disclosed herein may be utilized to trigger and manipulate tasks upon a recognition of a visual cue or a visual pattern of visual cues. For example, an authorized worker may present an approved or authorized visual cue or visual pattern within a field of view of an imaging device (e.g., a surveillance camera provided outside of a secure facility), and a gate or door may be opened upon a recognition of the approved or authorized visual cue or visual pattern. Similarly, a customer requesting assistance in a retail environment may simply hold up a predetermined object or pattern, e.g., a recognizable article of clothing, and some embodiments of the present disclosure may be configured to recognize the object or pattern, identify a qualified salesperson or agent associated with the recognized object or pattern, and proceed to the customer requesting assistance.

Additionally, the systems and methods of the present disclosure may be utilized to reconfigure an industrial automated system for performing one or more disparate tasks. For example, a first visual cue or first visual pattern may be placed onto a hood of an automobile being assembled on an assembly line following the completion of a cabin of an automobile. An imaging device may recognize the first visual cue or first visual pattern and instruct an automated machine (e.g., a robotic arm) to begin to install a windshield onto the cabin. A second visual cue or second visual pattern may be placed onto the hood of the automobile upon a completion of the windshield installation, and, upon recognition by the imaging device, a request for a manual inspection, evaluation or adjustment to the windshield alignment may be made. Similarly, a worker requesting that the contents of a storage vessel or facility (e.g., a bay, a bin, a cart, a pallet or a tote) within a fulfillment center be audited may place a predetermined visual cue or visual pattern onto the storage vessel or facility, and the storage vessel or facility may be diverted or delivered to a predetermined destination where an associate may conduct an audit.

The systems and methods of the present disclosure may be further utilized to control the tasks performed by one or more autonomous mobile robots within a fulfillment center or like facility, as well. For example, an autonomous mobile robot may be commanded to retrieve an item at a first location in a fulfillment center, or to deliver the item to a second location in the fulfillment center. The autonomous mobile robot may guide itself to the first location or the second location, recognize one or more visual cues or visual patterns posted onto one or more structural features or elements of the fulfillment center, including on one or more shelves, bins, racks, tiers, bars, hooks or other storage means within the fulfillment center, as well as walls, ceilings or floors, and identify and perform a task based on the recognition of the visual cues or visual patterns.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 5 or 7, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale, particularly regarding the relative locations of aspects or elements of the network delivery systems disclosed herein to one another in vertical and/or horizontal space.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An automated task performing system comprising:
   an imaging device;
   at least one data store;
   an automated machine; and a computing device in communication with the imaging device and the automated machine,
  wherein the computing device has at least one computer processor and at least one memory having processor-executable instructions stored thereon, and
  wherein the computing device, in response to execution of the processor-executable instructions by the at least one computer processor, is configured to at least:
    capture at least a first image of an object using the imaging device;
    recognize a first visual cue expressed within at least the first image, wherein the first visual cue is associated with at least a portion of the object;
    determine a state or condition of the object based at least in part on the first visual cue;
    determine an association between the state or condition of the object and at least one predetermined task to be performed upon the object based at least in part on information regarding a plurality of predetermined tasks maintained in the at least one data store;
    identify at least one action required for performing the at least one predetermined task based at least in part on the association, wherein the at least one action is to be executed by the automated machine;
    provide an electronic instruction for executing the at least one action to the automated machine;
    identify a desired state or condition of an environment in which the object is provided, wherein the desired state or condition of the environment is associated with the at least one predetermined task;
    capture at least a second image of the object using the imaging device;
    determine a state or condition of the environment based at least in part on the second image;
    determine that the state or condition of the environment is consistent with the desired state or condition of the environment; and
    in response to determining that the state or condition of the environment is consistent with the desired state or condition of the environment,
    store an indication that the at least one predetermined task has been performed.

2. The automated task performing system of claim 1, wherein the computing device is further configured to at least:
  identify a context associated with the first visual cue, wherein the association is determined based at least in part on the context.

3. The automated task performing system of claim 1, wherein the first visual cue comprises at least one of:
  an alphanumeric character;
  a symbol; or
  an icon,
  and
  wherein the first visual cue does not comprise a bar code.

4. A method comprising:
  capturing a first set of imaging data regarding an object by at least one imaging device;
  determining, by at least one computer processor, that the first set of imaging data comprises information regarding at least one visual cue associated with the object;
  recognizing, by the at least one computer processor, the at least one visual cue in at least a portion of the first set of imaging data;
  determining, by the at least one computer processor, a state or condition of the object based at least in part on the at least one visual cue;
  identifying, by the at least one computer processor, a first automated task associated with the state or condition of the object based at least in part on the at least one visual cue;
  providing, by the at least one computer processor, an instruction for performing at least one action associated with the first automated task to a first automated machine;
  identifying a desired state or condition of an environment in which the object is provided, wherein the desired state or condition of the environment is associated with the first automated task;
  capturing a second set of imaging data regarding the object by the at least one imaging device;
  determining a state or condition of the environment based at least in part on the second set of imaging data;
  determining whether the state or condition of the environment is consistent with the desired state or condition of the environment; and
  in response to determining that the state or condition of the environment is consistent with the desired state or condition of the environment,
  storing an indication that the first automated task has been performed.

5. The method of claim 4, wherein the first automated machine comprises the at least one imaging device.

6. The method of claim 4, wherein the first set of imaging data comprises at least one image of the object,
  wherein the at least one visual cue is expressed within the at least one image of the object.

7. The method of claim 6, further comprising:
  presenting, by at least one human, at least one of the object or the at least one visual cue within a field of view of the at least one imaging device at a first time,
  wherein the at least one image is captured by the at least one imaging device at the first time.

8. The method of claim 4, wherein recognizing the at least one visual cue in at least the portion of the first set of imaging data comprises:
  recognizing at least one of an edge, a contour or an outline of the object based at least in part on the first set of imaging data; and
  identifying the at least one visual cue based at least in part on the edge, the contour or the outline.

9. The method of claim 4, wherein identifying the first automated task associated with the state or condition of the object comprises:
  identifying a plurality of records stored in at least one data store, wherein each of the records comprises an association between one of a plurality of visual cues and at least one of a plurality of automated tasks;
  selecting at least one of the plurality of records corresponding to the state or condition of the object; and
  identifying the first automated task based at least in part on the selected at least one of the plurality of records.

10. The method of claim 4, wherein identifying the first automated task associated with the object comprises:
  determining a context associated with at least one of the at least one visual cue, the object or the environment,
  wherein the first automated task is identified based at least in part on the context.

11. A computer-implemented method comprising:
capturing a first set of imaging data regarding an object by at least one imaging device;
determining, by at least one computer processor, that the first set of imaging data comprises information regarding at least one visual cue associated with the object;
identifying, by the at least one computer processor, the at least one visual cue based at least in part on the first set of imaging data;
identifying, by the at least one computer processor, a first automated task associated with the object based at least in part on the at least one visual cue;
providing, by the at least one computer processor, an instruction for performing at least one action associated with the first automated task to a first automated machine;
identifying a desired condition of an environment in which the object is provided, wherein the desired condition of the environment is associated with the first automated task;
capturing a second set of imaging data regarding the object by the at least one imaging device;
determining a condition of the environment in which the object is provided based at least in part on the second set of imaging data;
determining whether the condition of the environment is consistent with the desired condition of the environment; and
upon determining that the condition of the environment is consistent with the desired condition of the environment,
storing an indication that the first automated task has been performed.

12. The computer-implemented method of claim 11, further comprising:
identifying, by the at least one computer processor, a second automated task associated with the object based at least in part on the at least one visual cue; and
providing, by the at least one computer processor, an instruction for performing at least one action associated with the second automated task to the first automated machine,
wherein the second automated task is identified based at least in part on the indication that the first automated task has been performed.

13. The computer-implemented method of claim 11, further comprising:
upon determining that the condition of the environment is not consistent with the desired condition of the environment,
storing an indication that the first automated task has not been performed;
identifying, by the at least one computer processor, a second automated task associated with the object based at least in part on the at least one visual cue; and
providing, by the at least one computer processor, an instruction for performing at least one action associated with the second automated task to the first automated machine,
wherein the second automated task is identified based at least in part on the indication that the first automated task has not been performed.

14. The method of claim 4, wherein the at least one visual cue comprises a first visual cue provided on at least one surface of the object, and
wherein recognizing the at least one visual cue in at least the portion of the first set of imaging data comprises:
recognizing the first visual cue in at least the portion of the first set of imaging data;
determining, by the at least one computer processor, at least one attribute of the first visual cue based at least in part on the first set of imaging data, wherein the at least one attribute of the first visual cue is at least one of:
a first position of the first visual cue on the at least one surface of the object;
a first orientation of the first visual cue on the at least one surface of the object; or
a first time at which the first set of imaging data was captured; and
defining a visual pattern based at least in part on the at least one attribute of the first visual cue, wherein the visual pattern comprises the first visual cue, and
wherein the first automated task associated with the state or condition of the object is identified based at least in part on the visual pattern.

15. The method of claim 14, wherein the at least one visual cue further comprises a second visual cue associated with the object,
wherein recognizing the at least one visual cue in at least the portion the first set of imaging data comprises:
recognizing the second visual cue in at least the portion of the first set of imaging data;
determining at least one attribute of the second visual cue based at least in part on the first set of imaging data, wherein the at least one attribute of the second visual cue is at least one of:
a second position of the second visual cue on the at least one surface of the object; or
a second orientation of the second visual cue on the at least one surface of the object,
wherein the visual pattern is defined based at least in part on the at least one attribute of the second visual cue, and
wherein the visual pattern comprises the second visual cue.

16. The method of claim 14, wherein the visual pattern further comprises a second visual cue provided on the at least one surface of the object, and
wherein the method further comprises:
capturing a second set of imaging data regarding the object by the at least one imaging device;
determining, by the at least one computer processor, that the second set of imaging data comprises information regarding the second visual cue;
recognizing the second visual cue in at least a portion of the second set of imaging data;
determining, by the at least one computer processor, at least one attribute of the second visual cue based at least in part on the second set of imaging data, wherein the at least one attribute of the second visual cue is at least one of:
a second position of the second visual cue on the at least one surface of the object;
a second orientation of the second visual cue on the at least one surface of the object; or
a second time at which the second set of imaging data was captured,
wherein the visual pattern is defined based at least in part on the at least one attribute of the second visual cue, and wherein the visual pattern further comprises the second visual cue.

17. A method comprising:

capturing at least a first image of at least a portion of an environment using an imaging device;

identifying a visual cue expressed within the first image;

determining a first state or condition of at least the portion of the environment based at least in part on the visual cue;

selecting a first action to be performed upon the environment based at least in part on at least one of the visual cue expressed within the first image or the first state or condition of at least the portion of the environment;

transmitting an instruction for performing at least a portion of the first action to an automated machine;

identifying a desired state or condition of at least the portion of the environment, wherein the desired state or condition is associated with the first action;

capturing a second image of at least the portion of the environment using the imaging device;

determining a second state or condition of at least the portion of the environment based at least in part on the second image;

determining that the second state or condition of at least the portion of the environment is consistent with the desired state or condition of at least the portion of the environment based at least in part on the second image;

in response to determining that the second state or condition of at least the portion of the environment is consistent with the desired state or condition of at least the portion of the environment, storing an indication that at least the portion of the first action has been performed.

18. The method of claim 17, wherein selecting the first action to be performed upon the environment further comprises:

identifying a context of the visual cue based at least in part on the first image, wherein the first action is selected based at least in part on the context of the visual cue.

19. The automated task performing system of claim 1, wherein the computing device is further configured to at least:

recognize a second visual cue expressed within the first image, wherein the second visual cue is affixed to at least the portion of the object; and define a visual pattern based at least in part on the first visual cue and the second visual cue, wherein the state or condition of the object is determined based at least in part on the visual pattern.

20. The method of claim 16, further comprising:

affixing, prior to the first time, the first visual cue to the at least one surface of the object; and affixing, prior to the second time, the second visual cue to the at least one surface of the object, wherein at least one of the first visual cue or the second visual cue is affixed to the at least one surface of the object by a human.

* * * * *